US012608253B2

(12) United States Patent
Wang

(10) Patent No.: US 12,608,253 B2
(45) Date of Patent: Apr. 21, 2026

(54) DATA PROCESSING METHOD AND APPARATUS FOR ELECTRONIC DEVICE, AND ELECTRONIC DEVICE AND STORAGE MEDIUM

(71) Applicant: SUZHOU METABRAIN INTELLIGENT TECHNOLOGY CO., LTD., Suzhou (CN)

(72) Inventor: Lupan Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/871,461

(22) PCT Filed: Aug. 31, 2023

(86) PCT No.: PCT/CN2023/116163
§ 371 (c)(1),
(2) Date: Dec. 3, 2024

(87) PCT Pub. No.: WO2024/131133
PCT Pub. Date: Jun. 27, 2024

(65) Prior Publication Data
US 2025/0355740 A1     Nov. 20, 2025

(30) Foreign Application Priority Data
Dec. 20, 2022    (CN) .......................... 202211636302.9

(51) Int. Cl.
*G06F 11/00*      (2006.01)
*G06F 1/28*       (2006.01)
*G06F 9/4401*     (2018.01)

(52) U.S. Cl.
CPC .............. *G06F 11/008* (2013.01); *G06F 1/28* (2013.01); *G06F 9/441* (2013.01)

(58) Field of Classification Search
CPC .......... G06F 11/008; G06F 1/28; G06F 9/441
See application file for complete search history.

(56) References Cited

U.S. PATENT DOCUMENTS 7,325,151 B2 * 1/2008 Maruichi .............. G06F 1/3203
                                                713/323
7,886,136 B2 * 2/2011 Yoon ..................... G06F 9/4418
                                                710/316
(Continued)

FOREIGN PATENT DOCUMENTS

CN        101971141 A      2/2011
CN        106814603 A      6/2017
(Continued)

*Primary Examiner* — Bryce P Bonzo
*Assistant Examiner* — Audrey Emma Whitesell
(74) *Attorney, Agent, or Firm* — IPro, PLLC

(57)                ABSTRACT
A method and apparatus for processing data of an electronic device, an electronic device and a storage medium are provided, when the electronic device runs the first operating system, first power information of the electronic device and first traffic information of the electronic device are acquired; a computer crash prediction result for the first operating system is generated through the first power information and/or the first traffic information; and the second operating system is run based on the computer crash prediction result, and the second operating system is switched to to process electronic data.

19 Claims, 3 Drawing Sheets

(56)                References Cited

U.S. PATENT DOCUMENTS

| | | | | |
|---|---|---|---|---|
| 9,465,771 | B2 * | 10/2016 | Davis | G06F 15/7803 |
| 10,048,996 | B1 * | 8/2018 | Bell | G06F 11/3006 |
| 11,934,661 | B1 * | 3/2024 | Cudak | G06F 3/067 |
| 2005/0081073 | A1 * | 4/2005 | Williams | G06F 9/30083 |
| | | | | 712/E9.032 |
| 2008/0115012 | A1 * | 5/2008 | Jann | G06F 11/0712 |
| | | | | 714/38.11 |
| 2009/0193298 | A1 * | 7/2009 | Mukherjee | G06F 11/0766 |
| | | | | 714/38.1 |
| 2014/0309806 | A1 * | 10/2014 | Ricci | G06F 21/31 |
| | | | | 701/1 |
| 2015/0185797 | A1 * | 7/2015 | Cooper | G06F 1/3275 |
| | | | | 713/340 |
| 2016/0041948 | A1 * | 2/2016 | Vichare | G06F 11/3452 |
| | | | | 702/181 |
| 2018/0246552 | A1 * | 8/2018 | Thompson | G06F 11/3093 |

FOREIGN PATENT DOCUMENTS

| | | | |
|---|---|---|---|
| CN | 111522691 | A | 8/2020 |
| CN | 111538608 | A | 8/2020 |
| CN | 111563719 | A | 8/2020 |
| CN | 111708653 | A | 9/2020 |
| CN | 115617411 | A | 1/2023 |
| JP | 2014059733 | A | 4/2014 |

* cited by examiner

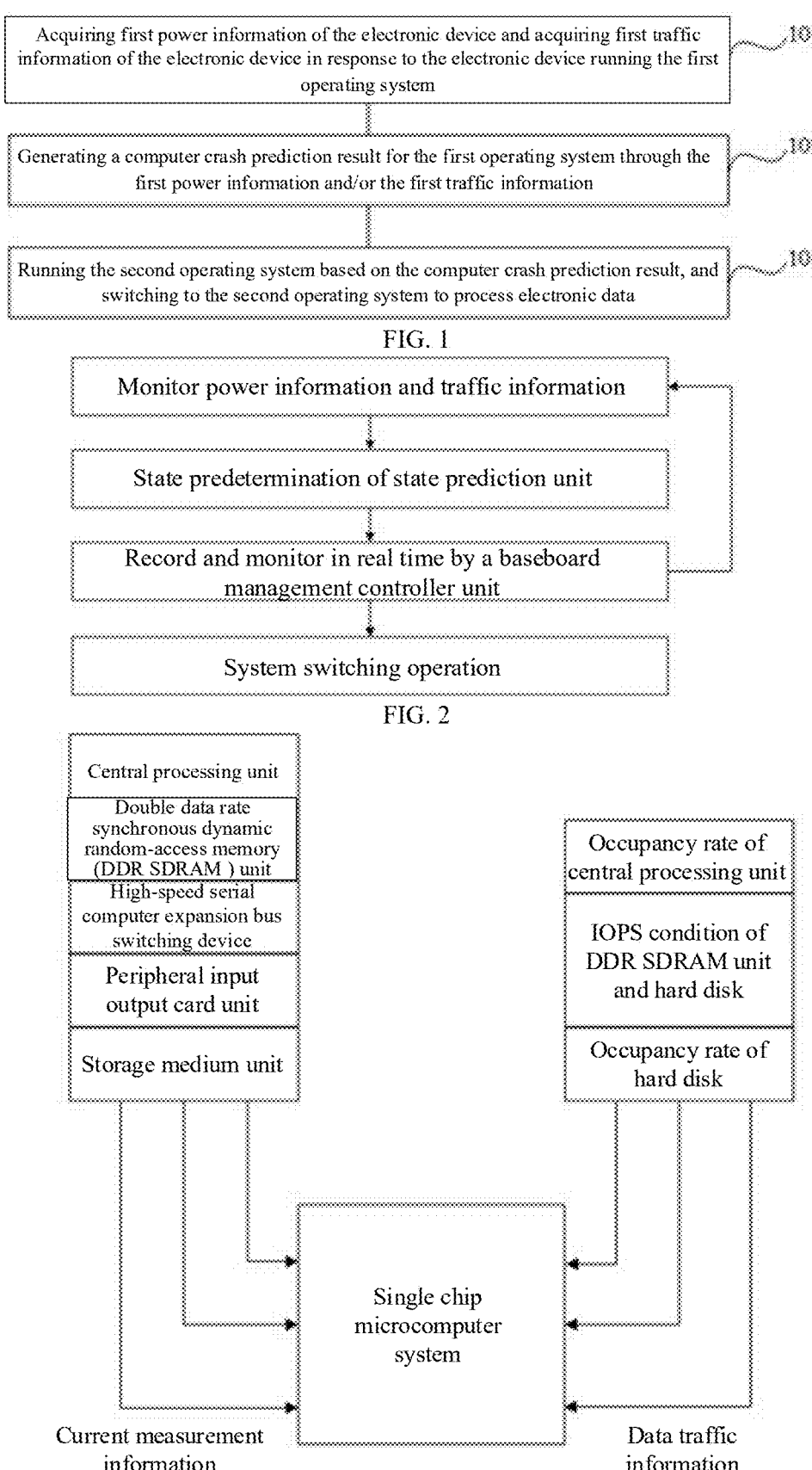

Acquiring first power information of the electronic device and acquiring first traffic information of the electronic device in response to the electronic device running the first operating system ⟋101

Generating a computer crash prediction result for the first operating system through the first power information and/or the first traffic information ⟋102

Running the second operating system based on the computer crash prediction result, and switching to the second operating system to process electronic data ⟋103

FIG. 1

Monitor power information and traffic information

State predetermination of state prediction unit

Record and monitor in real time by a baseboard management controller unit

System switching operation

FIG. 2

Central processing unit

Double data rate synchronous dynamic random-access memory (DDR SDRAM ) unit

High-speed serial computer expansion bus switching device

Peripheral input output card unit

Storage medium unit

Occupancy rate of central processing unit

IOPS condition of DDR SDRAM unit and hard disk

Occupancy rate of hard disk

Single chip microcomputer system

Current measurement information

Data traffic information

FIG. 3

DATA PROCESSING METHOD AND APPARATUS FOR ELECTRONIC DEVICE, AND ELECTRONIC DEVICE AND STORAGE MEDIUM

CROSS-REFERENCE TO RELATED APPLICATION

This application claims the priority of the Chinese Patent application filed on Dec. 20, 2022 before the China National Intellectual Property Administration with the application number of 202211636302.9, and the title of "DATA PROCESSING METHOD AND APPARATUS FOR ELECTRONIC DEVICE, AND ELECTRONIC DEVICE AND STORAGE MEDIUM", which is incorporated herein in its entirety by reference.

FIELD

The present application relates to the technical field of electronic device data processing and, more particularly, to a method for processing data of an electronic device, an apparatus for processing the data of the electronic device, the electronic device and a non-transitory computer-readable storage medium.

BACKGROUND

Computer crash is a computer term that refers to that an operating system cannot recover from a serious system error or there are hardware-level problems that cause the system to become unresponsive for a long time. In response to this situation, the solution in the related art is to restart the system, which leads to a long time in solving the computer crash problem, thus leading to inefficiency in solving the computer crash problem.

SUMMARY

A method for processing data of an electronic device, an apparatus for processing the data of the electronic device, the electronic device and a non-transitory computer-readable storage medium are provided in some embodiments of the present application to solve the problem of how to improve the efficiency of solving a computer crash problem.

A method for processing data of an electronic device is provided in some embodiments of the present application, wherein the electronic device is loaded with a first operating system and a second operating system, and the method may include:

acquiring first power information of the electronic device and acquiring first traffic information of the electronic device in response to the electronic device running the first operating system;

generating a computer crash prediction result for the first operating system through the first power information and/or the first traffic information; and running the second operating system based on the computer crash prediction result, and switching to the second operating system to process electronic data.

In some embodiments, the electronic device includes a central processing unit, and the step of acquiring the first power information of the electronic device may include:

acquiring central processing unit power information of the central processing unit.

In some embodiments, the electronic device includes a memory unit, and the method may further include:

acquiring memory unit power information of the memory unit.

In some embodiments, the electronic device includes a high-speed serial computer expansion bus standard conversion unit, and the method may further include:

acquiring conversion unit power information of the high-speed serial computer expansion bus standard conversion unit.

In some embodiments, the electronic device includes an input/output peripheral device unit and a storage medium unit, and the method may further include:

acquiring peripheral device and storage medium power information of the input/output peripheral device unit and the storage medium unit.

In some embodiments, the input/output peripheral device unit and the storage medium unit each have a corresponding electrical transmission route, and the electrical transmission routes are configured with sampling resistors for the input/output peripheral device unit and the storage medium unit; the electronic device is configured with a current measurement chip; the step of acquiring the peripheral device and storage medium power information of the input/output peripheral device unit and the storage medium unit may include:

acquiring the peripheral device and storage medium power information of the input/output peripheral device unit and the storage medium unit through the current measurement chip and the sampling resistors.

In some embodiments, the step of acquiring the first traffic information of the electronic device may include:

acquiring central processing unit read-write rate information of the central processing unit.

In some embodiments, the electronic device includes a hard disk, and the method may further include:

acquiring memory unit read-write rate information of the memory unit and hard disk read-write rate information of the hard disk.

In some embodiments, the method may further include:

acquiring a hard disk occupancy rate of the hard disk.

In some embodiments, the step of generating the computer crash prediction result for the first operating system through the first power information and/or the first traffic information may include:

generating the computer crash prediction result for the first operating system in response to power consumption and data processing amount of the central processing unit being determined to have a positive growth through the central processing unit power information and the central processing unit read-write rate information.

In some embodiments, the method may further include:

determining a first power fluctuation rate for the central processing unit power information; and generating the computer crash prediction result for the first operating system in response to the first power fluctuation rate exceeding a first preset threshold.

In some embodiments, the method may further include:

determining a first traffic growth rate for the central processing unit read-write rate information; and generating the computer crash prediction result for the first operating system in response to the first traffic growth rate exceeding a second preset threshold.

In some embodiments, the step of generating the computer crash prediction result for the first operating system through the first power information and/or the first traffic information may include:

generating the computer crash prediction result for the first operating system in response to power consumption and data processing amount of the memory unit being determined to have a positive growth through the memory unit power information and the memory unit read-write rate information.

In some embodiments, the method may further include:

determining a second power fluctuation rate for the memory unit power information; and generating the computer crash prediction result for the first operating system in response to the second power fluctuation rate exceeding a third preset threshold.

In some embodiments, the method may further include:

determining a second traffic growth rate for the memory unit read-write rate information; and generating the computer crash prediction result for the first operating system in response to the second traffic growth rate exceeding a fourth preset threshold.

In some embodiments, the step of generating the computer crash prediction result for the first operating system through the first power information and/or the first traffic information may include:

determining a third power fluctuation rate for the conversion unit power information; and generating the computer crash prediction result for the first operating system in response to the third power fluctuation rate exceeding a fifth preset threshold.

In some embodiments, the step of generating the computer crash prediction result for the first operating system through the first power information and/or the first traffic information may include:

determining a fourth power fluctuation rate for the peripheral device and storage medium power information; and generating the computer crash prediction result for the first operating system in response to the fourth power fluctuation rate exceeding a sixth preset threshold.

In some embodiments, the step of generating the computer crash prediction result for the first operating system through the first power information and/or the first traffic information may include:

determining a third traffic growth rate for the hard disk read-write rate information; and generating the computer crash prediction result for the first operating system in response to the third traffic growth rate exceeding a seventh preset threshold.

In some embodiments, the step of generating the computer crash prediction result for the first operating system through the first power information and/or the first traffic information may include:

determining a fourth traffic growth rate for the hard disk occupancy rate; and generating the computer crash prediction result for the first operating system in response to the fourth traffic growth rate exceeding an eighth preset threshold.

In some embodiments, the electronic device has a corresponding baseboard management controller and a corresponding system monitoring unit, and the step of running the second operating system based on the computer crash prediction result, and switching to the second operating system to process the electronic data may include:

in response to the baseboard management controller receiving the computer crash prediction result, controlling the baseboard management controller to send a monitoring instruction to the system monitoring unit, wherein the monitoring instruction is used for controlling the system monitoring unit to stop acquiring the first power information of the electronic device and to acquire a second traffic information of the electronic device; and in response to the second traffic information not changing within a preset time period, running the second operating system, and switching to the second operating system to process the electronic data.

In some embodiments, the step of running the second operating system, and switching to the second operating system to process the electronic data may include:

acquiring second power information of the electronic device; and in response to power parameters of the electronic device being determined to be stable through the first power information and the second power information, running the second operating system, and switching to the second operating system to process the electronic data.

In some embodiments, the method further includes:

in response to the power parameters of the electronic device being determined to be unstable within the preset time period through the first power information and the second power information, generating power supply abnormal information and storing the power supply abnormal information to the baseboard management controller.

In some embodiments, before the step of controlling the baseboard management controller to send the monitoring instruction to the system monitoring unit, the method may further include:

determining to-be-processed information for each load unit; and inputting the to-be-processed information into a flash memory unit of the baseboard management controller.

In some embodiments, the electronic device is loaded with a corresponding basic input/output system, and the method may further include:

restarting the basic input/output system and controlling the flash memory unit to perform data interaction with a bootstrap program of the basic input/output system to control the bootstrap program to run the second operating system based on the to-be-processed information inputted into the flash memory unit, and switching to the second operating system to process the electronic data.

In some embodiments, the method further includes:

in response to the second traffic information changing within the preset time period, generating a prediction error record using the baseboard management controller, and releasing the to-be-processed information.

An apparatus for processing data of an electronic device is further provided in the embodiments of the present application, wherein the electronic device is loaded with a first operating system and a second operating system, and the apparatus may include:

a first power information and first module traffic information acquisition module configured to acquire first power information of the electronic device and acquire first traffic information of the electronic device in response to the electronic device running the first operating system;

a computer crash prediction result generation module configured to generate a computer crash prediction result for the first operating system through the first power information and/or the first traffic information; and a system switching module configured to run the second operating system based on the computer crash prediction result, and switch to the second operating system to process electronic data.

In some embodiments, the electronic device includes a central processing unit, and the first power information and first module traffic information acquisition module may also be configured to acquire central processing unit power information of the central processing unit.

In some embodiments, the electronic device includes a memory unit, and the first power information and first module traffic information acquisition module may also be configured to acquire memory unit power information of the memory unit.

In some embodiments, the electronic device includes a high-speed serial computer expansion bus standard conversion unit, and the first power information and first module traffic information acquisition module may also be configured to acquire conversion unit power information of the high-speed serial computer expansion bus standard conversion unit.

In some embodiments, the electronic device includes an input/output peripheral device unit and a storage medium unit, and the first power information and first module traffic information acquisition module may also be configured to acquire peripheral device and storage medium power information of the input/output peripheral device unit and the storage medium unit.

In some embodiments, the input/output peripheral device unit and the storage medium unit each have a corresponding electrical transmission route, and the electrical transmission routes are configured with sampling resistors for the input/output peripheral device unit and the storage medium unit; the electronic device is configured with a current measurement chip; the first power information and first module traffic information acquisition module may also be configured to acquire the peripheral device and storage medium power information of the input/output peripheral device unit and the storage medium unit through the current measurement chip and the sampling resistors.

In some embodiments, the first power information and first module traffic information acquisition module may also be configured to acquire central processing unit read-write rate information of the central processing unit.

In some embodiments, the electronic device includes a hard disk, and the first power information and first module traffic information acquisition module may also be configured to acquire memory unit read-write rate information of the memory unit and hard disk read-write rate information of the hard disk.

In some embodiments, the first power information and first module traffic information acquisition module may also be configured to acquire a hard disk occupancy rate of the hard disk.

In some embodiments, the computer crash prediction result generation module may also be configured to generate the computer crash prediction result for the first operating system in response to power consumption and data processing amount of the central processing unit being determined to have a positive growth through the central processing unit power information and the central processing unit read-write rate information.

In some embodiments, the computer crash prediction result generation module may also be configured to determine a first power fluctuation rate for the central processing unit power information; and generate the computer crash prediction result for the first operating system in response to the first power fluctuation rate exceeding a first preset threshold.

In some embodiments, the computer crash prediction result generation module may also be configured to determine a first traffic growth rate for the central processing unit read-write rate information; and generate the computer crash prediction result for the first operating system in response to the first traffic growth rate exceeding a second preset threshold.

In some embodiments, the computer crash prediction result generation module may also be configured to generate the computer crash prediction result for the first operating system in response to power consumption and data processing amount of the memory unit being determined to have a positive growth through the memory unit power information and the memory unit read-write rate information.

In some embodiments, the computer crash prediction result generation module may also be configured to determine a second power fluctuation rate for the memory unit power information; and generate the computer crash prediction result for the first operating system in response to the second power fluctuation rate exceeding a third preset threshold.

In some embodiments, the computer crash prediction result generation module may also be configured to determine a second traffic growth rate for the memory unit read-write rate information; and generate the computer crash prediction result for the first operating system in response to the second traffic growth rate exceeding a fourth preset threshold.

In some embodiments, the computer crash prediction result generation module may also be configured to determine a third power fluctuation rate for the conversion unit power information; and generate the computer crash prediction result for the first operating system in response to the third power fluctuation rate exceeding a fifth preset threshold.

In some embodiments, the computer crash prediction result generation module may also be configured to determine a fourth power fluctuation rate for the peripheral device and storage medium power information; and generate the computer crash prediction result for the first operating system in response to the fourth power fluctuation rate exceeding a sixth preset threshold.

In some embodiments, the computer crash prediction result generation module may also be configured to determine a third traffic growth rate for the hard disk read-write rate information; and generate the computer crash prediction result for the first operating system in response to the third traffic growth rate exceeding a seventh preset threshold.

In some embodiments, the computer crash prediction result generation module may also be configured to determine a fourth traffic growth rate for the hard disk occupancy rate; and generate the computer crash prediction result for the first operating system in response to the fourth traffic growth rate exceeding an eighth preset threshold.

In some embodiments, the electronic device has a corresponding baseboard management controller and a corresponding system monitoring unit; the second operating system is run based on the computer crash prediction result, and the system switching module may also be configured to, in response to the baseboard management controller receiving the computer crash prediction result, control the baseboard management controller to send a monitoring instruction to the system monitoring unit, wherein the monitoring instruction is used for controlling the system monitoring unit to stop acquiring the first power information of the electronic device and to acquire a second traffic information of the electronic device; and in response to the second traffic information not changing within a preset time period, run the second operating system, and switch to the second operating system to process the electronic data.

In some embodiments, the system switching module may also be configured to acquire second power information of the electronic device; and in response to power parameters of the electronic device being determined to be stable through the first power information and the second power information, run the second operating system, and switch to the second operating system to process the electronic data.

In some embodiments, the system switching module may also be configured to, in response to power parameters of the electronic device being determined to be unstable within the preset time period through the first power information and the second power information, generate power supply abnormal information, and store the power supply abnormal information to the baseboard management controller.

In some embodiments, the system switching module may also be configured to determine to-be-processed information for each load unit; and input the to-be-processed information into a flash memory unit of the baseboard management controller.

In some embodiments, the electronic device is loaded with a corresponding basic input/output system, and the system switching module may also be configured to restart the baseboard management controller, control the flash memory unit to perform data interaction with a bootstrap program of the baseboard management controller to control the bootstrap program to run the second operating system based on the to-be-processed information inputted into the flash memory unit, and switch to the second operating system to process the electronic data.

In some embodiments, the system switching module may also be configured to, in response to the second traffic information changing within the preset time period, generate a prediction error record using the baseboard management controller, and release the to-be-processed information.

An electronic device is further provided in some embodiments of the present application, which includes a processor, a communication interface, a memory and a communication bus, wherein the processor, the communication interface and the memory are communicated with each other through the communication bus;

the memory is configured to store a computer program; and the processor is configured to, in response to executing the program stored on the memory, implement the above method for processing the data of the electronic device.

A non-transitory computer-readable storage medium storing instructions is further provided in some embodiments of the present application, the instructions, in response to being executed by one or more processors, cause the one or more processors to perform the above method for processing the data of the electronic device.

Some embodiments of the present application include the following advantages.

In some embodiments, the first power information of the electronic device and the first traffic information of the electronic device are acquired when the electronic device runs a first operating system. The computer crash prediction result for the first operating system is generated through the first power information and/or the first traffic information. The second operating system is run based on the computer crash prediction result, and the second operating system is switched to to process the electronic data. Thus, the need to restart to recover system operations when computer crash occurs is avoided, thereby the processing time when solving the computer crash problem is reduced, and the processing efficiency when solving the computer crash problem is further improved.

BRIEF DESCRIPTION OF THE DRAWINGS

FIG. 1 is a flowchart of steps of a method for processing data of an electronic device according to some embodiments of the present application;

FIG. 2 is a flowchart of steps of another method for processing data of an electronic device according to some embodiments of the present application;

FIG. 3 is a schematic diagram of data interaction for a system monitoring unit according to some embodiments of the present application;

DETAILED DESCRIPTION

Figures 4, 5:
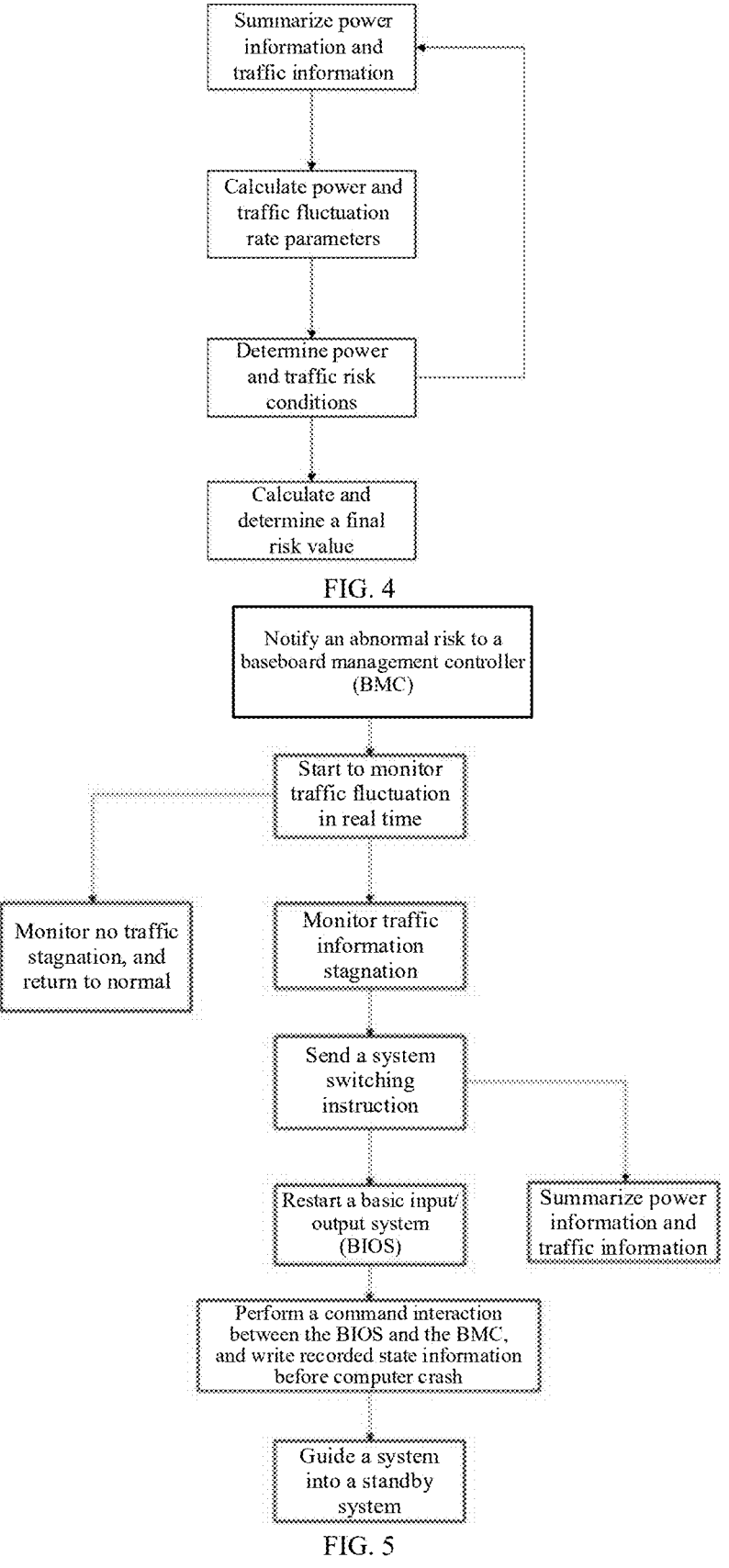
FIG. 4 is a schematic diagram of a data processing flow for a state predetermination unit according to some embodiments of the present application.
FIG. 5 is a schematic diagram of a data processing flow for a system state recording unit and a system switching execution unit according to some embodiments of the present application.

In order to make the above-mentioned objects, features and advantages of the present application more obviously and easily to understand, the present application is further described in detail below with reference to the accompanying drawings and implementations.

In the era of big data, higher demands are put forward for the reliability of storage arrays, especially for the working stability of storage systems. With the rapid growth of business data volumes, as well as the continuous upgrading of storage unit capacity and data transmission rate, the normal running of the storage systems is under great pressure and burden. With the increase of system transmission traffic and system pressure, system computer crash may occur at a certain time. At this moment, the system cannot run, and data transmission is terminated. However, in view of this situation, the current solving idea is to restart the system. This restart process may result in the loss of the currently processed data, and meanwhile, the system restart process is very long. This process may also result in that the work of the storage node is suspended, and in severe cases, this process may result in that the whole data center will be paralyzed. Therefore, there is an urgent need for a system computer crash recovery method that may record the previous running state and quickly recover the system to the state before the computer crash.

Based on the above-mentioned problems, in some embodiments of the present application, the traditional method is abandoned, that is, a device is recovered by using a method of restarting a system after the system computer crash. The method of restarting a system may result in data loss, and may also prolong the time for system recovery, thus low data storage efficiency is resulted in.

In some embodiments of the present application, storage system computer crash self-recovery logic and relevant circuit units may be designed in an electronic device, for example, a unified storage array. The storage system computer crash self-recovery logic and relevant circuit units mainly include a system monitoring unit, a state predetermination unit, a system state recording unit and a system switching execution unit. In some embodiments of the present application, a power-traffic bidirectional system monitoring unit is designed on hardware. On one hand, the power-traffic bidirectional system monitoring unit may be configured to monitor a current change situation of a main power load in a system, on the other hand, the power-traffic bidirectional system monitoring unit may also be configured to monitor current data traffic information of a data transmission relevant unit and quantitatively feed back a monitoring result. The state predetermination unit is provided in a software state. With reference to historical data and in combination with the current power and traffic situation, the current state is quantified in a hierarchical form, and a simple next state prediction is performed. In some embodiments of the present application, when it is predicted that there is a risk of system computer crash in the next state in the prediction process, a state recording and system switching algorithm is designed to ensure returning to the state before the computer crash in the shortest time without affecting data processing related work, thereby smooth switching between two systems is ensured, the influence of system computer crash is avoided, and the data backup processing reliability of the storage device is improved.

Referring to FIG. 1, a flowchart of steps of a method for processing data of an electronic device according to an embodiment of the present application is shown. The method may include the following steps:

step 101, acquiring first power information of the electronic device and acquiring first traffic information of the electronic device in response to the electronic device running the first operating system;

step 102, generating a computer crash prediction result for the first operating system through the first power information and/or the first traffic information; and step 103, running the second operating system based on the computer crash prediction result, and switching to the second operating system to process electronic data.

In some embodiments, the method may be applied to an electronic device loaded with a plurality of operating systems. In practical application, a device that may be loaded with a plurality of operating systems and configured to process electronic data may be considered an electronic device, such as a unified storage array, a server, a military computer motherboard control system, and a personal computer (PC).

In some embodiments, the electronic device is a unified storage (also sometimes referred to as network unified storage or NUS) that is a storage system capable of running and managing files and application programs on a single device. To this end, the unified storage system integrates file-based and block-based accesses on a single storage platform, supporting fiber channel-based storage area network (SAN), Internet protocol (IP)-based SAN (Internet small computer system interface (iSCSI)), and network attached storage (NAS).

In some embodiments, the electronic device may include a system monitoring unit, a state predetermination unit, a system state recording unit and a system switching execution unit, and may be loaded with a plurality of operating systems. The first operating system may be a default initial operating system, and the second operating system may be a standby operating system.

In some embodiments, when the electronic device runs the first operating system, the first power information of the electronic device and the first traffic information of the electronic device may be acquired. The power information may be information characterizing the power consumption condition of a hardware device, for example, current parameters and read-write rate parameters of a central processing unit (CPU) and a memory are acquired through the system monitoring unit.

In some embodiments, the first power information and the first traffic information may be power information and traffic information acquired before the computer crash prediction result is generated.

After acquiring the first power information and the first traffic information, the computer crash prediction result for the first operating system may be generated through the first power information and/or the first traffic information.

For example, the state predetermination unit may generate a computer crash prediction result through conversion unit power information of a high-speed serial computer expansion bus standard conversion unit, may generate a computer crash prediction result through a read-write rate of a hard disk, and may also generate a computer crash prediction result through the current parameter and read-write rate parameter of the CPU.

Certainly, the above-mentioned examples are merely exemplary, and a person skilled in the art may adopt relevant working parameters of other hardware as the first power information and the first traffic information.

After generating the computer crash prediction result, the system switching execution unit may run the second operating system based on the prediction result and switch to the second operating system to process the electronic data, thereby the need to restart to recover system operations when computer crash occurs is avoided.

In some embodiments, the first power information of the electronic device and the first traffic information of the electronic device are acquired when the electronic device runs a first operating system. The computer crash prediction result for the first operating system is generated through the first power information and/or the first traffic information. The second operating system is run based on the computer crash prediction result, and the second operating system is switched to to process the electronic data. Thus, the need to restart to recover system operations when computer crash occurs is avoided, thereby the processing time when solving the computer crash problem is reduced, and the processing efficiency when solving the computer crash problem is further improved.

In some embodiments, since the power information and the traffic information may be used separately as the criteria for determining whether system computer crash occurs, or may be used together to determine whether system computer crash occurs, in practical application, parameters for determining whether system computer crash occurs may also be different for different hardware. For example, for a hard disk, the read-write rate parameter of the hard disk may better reflect whether system computer crash occurs than the current and voltage parameters of the hard disk. Therefore, in some embodiments, the system monitoring unit may acquire bidirectional information for target hardware, i.e., acquiring the power information and the current information separately for the target hardware.

In some embodiments, the electronic device includes a central processing unit, and the step of acquiring first power information of the electronic device includes:

acquiring central processing unit power information of the central processing unit.

In practical application, a computer processor is a functional unit that interprets and executes instructions, also referred to as a central processing unit or CPU, which is a central nervous system of a computer, in contrast to devices around the processor and memory called peripherals, for example, keyboards, displays, disks, tape drives and so on are peripherals. Each processor has a unique set of operating commands, which may be referred to as a processor's instruction set. For example, storing, calling and so on are operating commands. Computer designers refer to computers as machines. Therefore, instruction sets are sometimes referred to as machine instructions, and the binary language used to write these instructions is also referred to as machine language. The CPU is the computing core and control core of a computer, and CPU power data is an important indicator to determine the system computer crash.

In some embodiments, the central processing unit power information of the CPU may be acquired through the system monitoring unit.

For example, the power information such as a working current parameter and a working voltage parameter of the CPU may be continuously acquired through the system monitoring unit.

In some embodiments, the central processing unit power information of the CPU may be acquired through the system monitoring unit so that collecting data of hardware in the electronic device may be acquired, thereby the prediction accuracy of the computer crash prediction result is improved and the processing efficiency when solving the computer crash problem is further improved.

In some embodiments, the electronic device includes a memory unit, and the method further includes:

acquiring memory unit power information of the memory unit.

A memory is an important component of a computer, also referred to as an internal memory and a main memory, and is configured to temporarily store computational data in the CPU and data exchanged with an external memory such as a hard disk. It is a bridge through which the external memory communicates with the CPU. All programs in the computer run in the memory, and the strength of the performance of the memory affects the overall level of the computer. As long as the computer starts running, the operating system transfers the data that needs to be computed from the memory to the CPU for computation. After the computation is completed, the CPU outputs the results. Memory power data is an important indicator to determine the system computer crash.

In some embodiments, the memory unit may be a double data rate (DDR) synchronous dynamic random-access memory (SDRAM). The DDR uses a more advanced synchronization circuit so that the main steps of sending and outputting the designated address and data are performed independently while remaining fully synchronized with the CPU. The DDR uses delay locked loop (DLL, providing a data filtering signal) technology. When the data is valid, a memory controller may use this data filtering signal to accurately locate the data, outputting once every 16 cycles and resynchronizing data from different memory modules. The DDR essentially doubles the speed of SDRAM without increasing the clock frequency, allowing data to be read on the rising edge of the clock pulse and the falling edge of the clock pulse, thus the speed of the DDR is twice the speed of the standard SDRAM.

In some embodiments, the memory unit power information of the memory unit may be acquired through the system monitoring unit.

For example, the power information such as a working current parameter and a working voltage parameter of the memory unit may be continuously acquired through the system monitoring unit.

In some embodiments, the memory unit power information of the memory unit may be acquired through the system monitoring unit so that data of hardware in the electronic device may be collected directionally, thereby the prediction accuracy of the computer crash prediction result is improved and the processing efficiency when solving the computer crash problem is further improved.

In some embodiments, the electronic device includes a high-speed serial computer expansion bus standard conversion unit, and the method further includes:

acquiring conversion unit power information of the high-speed serial computer expansion bus standard conversion unit.

Peripheral component interconnect express (PCI-Express) is a high-speed serial computer expansion bus standard, originally named "third generation input/output (3GIO)" proposed by Intel in 2001 to replace the old peripheral component interconnect (PCI, a criterion for defining a local bus), PCI-X, and accelerate graphical port (AGP) bus standards.

The PCIe belongs to a high-speed serial point-to-point dual-channel high-bandwidth transmission, wherein the connected devices are allocated exclusive channel bandwidth and do not share the bus bandwidth. It mainly supports functions, such as active power management, error reporting, end-to-end reliable transmission, hot-plugging, and quality of service (QOS). The PCIe was renamed to "PCI-Express (PCI-e)" after being certified and released by the PCI-special interest group (SIG). Its main advantages are high data transmission rates and considerable development potential. PCI Express also has various specifications, from PCI Express x1 to PCI Express x32, to meet the needs of low-speed devices and high-speed devices that will appear at some time in the future. An interface of the PCI-Express is the PCIe 3.0 interface, with a bit rate of 8 Gbps, which is approximately twice the bandwidth of the previous generation products. The PCI-e includes a series of important new functions such as transmitter and receiver equalization, PLL improvements, and clock data recovery, which are used to improve data transmission and data protection performance.

The high-speed serial computer expansion bus standard conversion unit may be a high-speed serial computer expansion bus switching device PCIE SWITCH. PCIE SWITCH power data is an important indicator to determine the system computer crash.

In some embodiments, the conversion unit power information of the high-speed serial computer expansion bus standard conversion unit may be acquired through the system monitoring unit.

For example, the power information such as a working current parameter and a working voltage parameter of the high-speed serial computer expansion bus standard conversion unit is acquired through the system monitoring unit.

In some embodiments, the conversion unit power information of the high-speed serial computer expansion bus standard conversion unit may be acquired through the system monitoring unit so that data of hardware in the electronic device may be collected directionally, thereby the prediction accuracy of the computer crash prediction result is improved and the processing efficiency when solving the computer crash problem is further improved.

In some embodiments, the electronic device includes an input/output peripheral device unit and a storage medium unit, and the method further includes:

acquiring peripheral device and storage medium power information of the input/output peripheral device unit and the storage medium unit.

In practical application, an I/O peripheral device refers to an "input/output peripheral device", which is hardware capable of performing data transmission with a computer. An input device is a device that inputs data and information to the computer, is a bridge through which the computer is communicated with users or other devices, and is one of the primary apparatuses of information exchange between users and computer systems. An output device is a generic term for a device that transmits external world information to a computer and a device that returns processing results to the external world, and may express various calculation result data or information in the form of numbers, characters, images, sounds, etc.

The storage medium refers to a carrier for storing data, such as a floppy disk, an optical disk, a digital video disk (DVD), a flash memory, a USB flash disk, a CompactFlash (CF) card, a secure digital (SD) card, a multimedia (MMC) card, a smart media (SM) card, a memory stick, and an xD card. Power data of the input/output peripheral device unit and the storage medium unit is an important indicator to determine the system computer crash.

In some embodiments, the peripheral device and storage medium power information of the input/output peripheral device unit and the storage medium unit may be acquired through the system monitoring unit.

For example, the peripheral device and storage medium power information such as a working current parameter and a working voltage parameter of the input/output peripheral device unit and the storage medium unit is acquired through the system monitoring unit.

In some embodiments, the peripheral device and storage medium power information of the input/output peripheral device unit and the storage medium unit may be acquired through the system monitoring unit so that data of hardware in the electronic device may be collected directionally, thereby the prediction accuracy of the computer crash prediction result is improved and the processing efficiency when solving the computer crash problem is further improved.

In some embodiments, the input/output peripheral device unit and the storage medium unit each have a corresponding electrical transmission route, and the electrical transmission routes are configured with sampling resistors for the input/output peripheral device unit and the storage medium unit; the electronic device is configured with a current measurement chip; the step of acquiring the peripheral device and storage medium power information of the input/output peripheral device unit and the storage medium unit includes:

acquiring the peripheral device and storage medium power information of the input/output peripheral device unit and the storage medium unit through the current measurement chip and the sampling resistors.

In practical application, since the power of the input/output peripheral device unit and the storage medium unit is relatively low, and the number of targets needing to be collected is large, it is inconvenient to acquire the power information by viewing power supply chip pin information. Therefore, the sampling resistors may be configured in the electrical transmission routes corresponding to the input/output peripheral device unit and the storage medium unit, and after the power information of the input/output peripheral device unit and the storage medium unit is collected through the sampling resistors, the power information is summarized in the current measurement chip.

In some embodiments, the peripheral device and storage medium power information of the input/output peripheral device unit and the storage medium unit is acquired through the current measurement chip and the sampling resistor so that data of the hardware with small power data and many acquisition points in the electronic device is collected directionally, thereby the prediction accuracy of the computer crash prediction result is improved and the processing efficiency when solving the computer crash problem is further improved.

In some embodiments, the step of acquiring the first traffic information of the electronic device includes:

acquiring central processing unit read-write rate information of the CPU.

In practical application, read-write rate information is an important indicator to evaluate hardware computing power and is also an important indicator to determine whether system computer crash occurs.

In some embodiments, the central processing unit read-write rate information of the CPU may be acquired through the system monitoring unit.

In some embodiments, the central processing unit read-write rate information of the CPU may be acquired through the system monitoring unit so that data of hardware in the electronic device may be acquired, thereby the prediction accuracy of the computer crash prediction result is improved and the processing efficiency when solving the computer crash problem is further improved.

In some embodiments, the electronic device includes a hard disk, and the method further includes:

acquiring memory unit read-write rate information of the memory unit and hard disk read-write rate information of the hard disk.

In practical application, read-write rate information is an important indicator to evaluate hardware computing power and is also an important indicator to determine whether system computer crash occurs.

In some embodiments, the memory unit read-write rate information of the memory unit and the hard disk read-write rate information of the hard disk may be acquired through the system monitoring unit.

In some embodiments, the memory unit read-write rate information of the memory unit and the hard disk read-write rate information of the hard disk may be acquired through the system monitoring unit so that data of hardware in the electronic device may be collected, thereby the prediction accuracy of the computer crash prediction result is improved and the processing efficiency when solving the computer crash problem is further improved.

In some embodiments, the method further includes:

acquiring a hard disk occupancy rate of the hard disk.

In practical application, the hard disk occupancy rate is an important indicator to evaluate the load pressure of the hard disk and is also an important indicator to determine whether system computer crash occurs.

In some embodiments, the hard disk occupancy rate of the hard disk may be acquired through the system monitoring unit.

In some embodiments, the hard disk occupancy rate of the hard disk may be acquired through the system monitoring unit so that data of hardware in the electronic device may be collected, thereby the prediction accuracy of the computer crash prediction result is improved and the processing efficiency when solving the computer crash problem is further improved.

In some embodiments, when the system is working normally, the system monitoring unit may monitor first power information and first traffic information of a load unit in the system, report the process in real time, and report monitored real-time data to a state prediction unit. The prediction unit sequentially analyzes and quantifies the monitored first power information and first traffic information according to historical data, until it is determined that an abnormality occurs through one or both of the first power information and the first traffic information, i.e., the abnormality may result in the system computer crash.

In some embodiments, the step of generating the computer crash prediction result for the first operating system through the first power information and/or the first traffic information includes:

generating the computer crash prediction result for the first operating system when the power consumption and the data processing amount of the CPU are determined to have a positive growth through the central processing unit power information and the central processing unit read-write rate information.

In practical application, no matter whether the power consumption and the data processing amount of the CPU have a positive growth or a negative growth, the growth amplitudes of the power consumption and the data processing amount are not necessarily stable. Therefore, if the overall growth amplitude of the power consumption and the data processing amount of the CPU in a unit time period is positive, the power consumption and the data processing amount of the CPU may be considered to have a positive growth.

In some embodiments, the system monitoring unit may monitor the current/voltage parameter and the read-write rate information of the CPU in the system, report the process in real time, and report monitored real-time data to the state prediction unit. According to the historical data, if the current/voltage parameter and the read-write rate information of the CPU both have a positive growth in a unit time period, the prediction unit may determine that the operating system computer crash is about to occur. Thus, the computer crash prediction result for the first operating system may be generated.

In some embodiments, when the power consumption and the data processing amount of the CPU are determined to have a positive growth through the central processing unit power information and the central processing unit read-write rate information, the computer crash prediction result for the first operating system is generated so that the computer crash risk of the system is automatically determined through relevant monitoring parameters of a load unit, and the processing efficiency when solving the computer crash problem is further improved.

In some embodiments, the method further includes:

determining a first power fluctuation rate for the central processing unit power information; and generating the computer crash prediction result for the first operating system when the first power fluctuation rate exceeds a first preset threshold.

In some embodiments, the power fluctuation rate may be a ratio of a unit current increase value in the current period to a unit current increase value in the previous period and the power fluctuation rate may be an important indicator to determine the system computer crash.

In some embodiments, the state prediction unit may determine the first power fluctuation rate for the central processing unit power information, configure a corresponding first preset threshold for the first current fluctuation rate, and generate the computer crash prediction result for the first operating system when the first power fluctuation rate exceeds the first preset threshold.

In some embodiments, the first power fluctuation rate for the central processing unit power information is determined, and the computer crash prediction result for the first operating system is generated when the first power fluctuation rate exceeds the first preset threshold so that the computer crash risk of the system is automatically determined through relevant monitoring parameters of a load unit, and the processing efficiency when solving the computer crash problem is further improved.

In some embodiments, the method further includes:

determining a first traffic growth rate for the central processing unit read-write rate information; and generating the computer crash prediction result for the first operating system when the first traffic growth rate exceeds a second preset threshold.

In practical application, the traffic growth rate may be a ratio of the data traffic increase in the present period to the traffic information average increase in the previous period, and the traffic growth rate may be an important indicator to determine the system computer crash.

In some embodiments, the state prediction unit may determine the first traffic growth rate for the central processing unit read-write rate information, configure a corresponding second preset threshold for the first traffic growth rate, and generate the computer crash prediction result for the first operating system when the first traffic growth rate exceeds the second preset threshold.

In some embodiments, the first traffic growth rate for the central processing unit read-write rate information is determined, and the computer crash prediction result for the first operating system is generated when the first traffic growth rate exceeds the second preset threshold so that the computer crash risk of the system is automatically determined through relevant monitoring parameters of a load unit, and the processing efficiency when solving the computer crash problem is further improved.

In some embodiments, the step of generating the computer crash prediction result for the first operating system through the first power information and/or the first traffic information includes:

generating the computer crash prediction result for the first operating system when the power consumption and data processing amount of the memory unit are determined to have a positive growth through the memory unit power information and the memory unit read-write rate information.

In practical application, no matter whether the power consumption and the data processing amount of the memory unit have a positive growth or a negative growth, the growth amplitudes of the power consumption and the data processing amount are not necessarily stable. Therefore, if the overall growth amplitude of the power consumption and the data processing amount of the memory unit in a unit time period is positive, the power consumption and the data processing amount of the memory unit may be considered to have a positive growth.

In some embodiments, the system monitoring unit may monitor the current/voltage parameter and the read-write rate information of the DDR in the system, report the process in real time, and report monitored real-time data to the state prediction unit. According to the historical data, if the current/voltage parameter and the read-write rate information of the DDR both have a positive growth in a unit time period, the prediction unit may determine that the operating system computer crash is about to occur. Thus, the computer crash prediction result for the first operating system may be generated.

In some embodiments, when the power consumption and the data processing amount of the memory unit are determined to have a positive growth through the memory unit power information and the memory unit read-write rate information, the computer crash prediction result for the first operating system is generated so that the computer crash risk of the system is automatically determined through relevant monitoring parameters of a load unit, and the processing efficiency when solving the computer crash problem is further improved.

In some embodiments, the method further includes:
determining a second power fluctuation rate for the memory unit power information; and
generating the computer crash prediction result for the first operating system when the second power fluctuation rate exceeds a third preset threshold.

In some embodiments, the power fluctuation rate may be a ratio of the unit current increase value in the current period to the unit current increase value in the previous period, and the power fluctuation rate may be an important indicator to determine the system computer crash.

In some embodiments, the state prediction unit may determine the second power fluctuation rate for the memory unit power information, configure a corresponding third preset threshold for the second current fluctuation rate, and generate the computer crash prediction result for the first operating system when the second power fluctuation rate exceeds the third preset threshold.

In some embodiments, the computer crash prediction result for the first operating system is generated when the second power fluctuation rate exceeds the third preset threshold so that the computer crash risk of the system is automatically determined through relevant monitoring parameters of a load unit, and the processing efficiency when solving the computer crash problem is further improved.

In some embodiments, the method further includes:
determining a second traffic growth rate for the memory unit read-write rate information; and
generating the computer crash prediction result for the first operating system when the second traffic growth rate exceeds a fourth preset threshold.

In practical application, the traffic growth rate may be a ratio of the data traffic increase in the present period to the traffic information average increase in the previous period, and the traffic growth rate may be an important indicator to determine the system computer crash.

In some embodiments, the state prediction unit may determine the second traffic growth rate for the memory unit read-write rate information, configure a corresponding fourth preset threshold for the second traffic growth rate, and generate the computer crash prediction result for the first operating system when the second traffic growth rate exceeds the fourth preset threshold.

In some embodiments, the second traffic growth rate for the memory unit read-write rate information is determined, and the computer crash prediction result for the first operating system is generated when the second traffic growth rate exceeds the fourth preset threshold so that the computer crash risk of the system is automatically determined through relevant monitoring parameters of a load unit, and the processing efficiency when solving the computer crash problem is further improved.

In some embodiments, the step of generating the computer crash prediction result for the first operating system through the first power information and/or the first traffic information includes:
determining a third power fluctuation rate for the conversion unit power information; and
generating the computer crash prediction result for the first operating system when the third power fluctuation rate exceeds a fifth preset threshold.

In practical application, since the power information and the traffic information may be used separately as the criteria for determining whether system computer crash occurs, or may be used together to determine whether system computer crash occurs, in practical application, parameters for determining whether system computer crash occurs may also be different for different hardware.

The power fluctuation rate may be a ratio of the unit current increase value in the current period to the unit current increase value in the previous period, and the power fluctuation rate may be an important indicator to determine the system computer crash.

Therefore, in some embodiments, the conversion unit power information for the high-speed serial computer expansion bus standard conversion unit may be used as a reference indicator to determine whether system computer crash occurs to generate the computer crash prediction result for the first operating system.

In some embodiments, the state prediction unit may determine a third power fluctuation rate for the conversion unit power information, configure a corresponding fifth preset threshold for the third current fluctuation rate, and generate the computer crash prediction result for the first operating system when the third power fluctuation rate exceeds the fifth preset threshold.

In some embodiments, the third power fluctuation rate for the conversion unit power information is determined, and the computer crash prediction result for the first operating system is generated when the third power fluctuation rate exceeds the fifth preset threshold so that the computer crash risk of the system is automatically determined through relevant monitoring parameters of a load unit, and the processing efficiency when solving the computer crash problem is further improved.

In some embodiments, the step of generating the computer crash prediction result for the first operating system through the first power information and/or the first traffic information includes:
determining a fourth power fluctuation rate for the peripheral device and storage medium power information; and
generating the computer crash prediction result for the first operating system when the fourth power fluctuation rate exceeds a sixth preset threshold.

In practical application, since the power information and the traffic information may be used separately as the criteria for determining whether system computer crash occurs, or may be used together to determine whether system computer crash occurs, in practical application, parameters for determining whether system computer crash occurs may also be different for different hardware.

The power fluctuation rate may be a ratio of the unit current increase value in the current period to the unit current increase value in the previous period, and the power fluctuation rate may be an important indicator to determine the system computer crash.

Therefore, in some embodiments, the peripheral device and storage medium power information for the input/output peripheral device unit and the storage medium unit may be used as a reference indicator to determine whether system computer crash occurs to generate the computer crash prediction result for the first operating system.

In some embodiments, the state prediction unit may determine the fourth power fluctuation rate for the peripheral device and storage medium power information, configure a corresponding sixth preset threshold for the fourth power fluctuation rate, and generate the computer crash prediction result for the first operating system when the fourth power fluctuation rate exceeds the sixth preset threshold.

In some embodiments, the fourth power fluctuation rate for the peripheral device and storage medium power information is determined, and the computer crash prediction result for the first operating system is generated when the fourth power fluctuation rate exceeds the sixth preset threshold so that the computer crash risk of the system is automatically determined through relevant monitoring parameters of a load unit, and the processing efficiency when solving the computer crash problem is further improved.

In some embodiments, the step of generating the computer crash prediction result for the first operating system through the first power information and/or the first traffic information includes:

determining a third traffic growth rate for the hard disk read-write rate information; and generating the computer crash prediction result for the first operating system when the third traffic growth rate exceeds a seventh preset threshold.

In practical application, since the power information and the traffic information may be used separately as the criteria for determining whether system computer crash occurs, or may be used together to determine whether system computer crash occurs, in practical application, parameters for determining whether system computer crash occurs may also be different for different hardware.

In practical application, the traffic growth rate may be a ratio of the data traffic increase in the present period to the traffic information average increase in the previous period and may be an important indicator to determine the system computer crash.

Therefore, in some embodiments, the hard disk read-write rate information for the hard disk may be used as a reference indicator to determine whether system computer crash occurs to generate the computer crash prediction result for the first operating system.

In some embodiments, the state prediction unit may determine the third traffic growth rate for the hard disk read-write rate information, configure a corresponding seventh preset threshold for the third traffic growth rate, and generate the computer crash prediction result for the first operating system when the third traffic growth rate exceeds the seventh preset threshold.

In some embodiments, the third traffic growth rate for the hard disk read-write rate information is determined, and the computer crash prediction result for the first operating system is generated when the third traffic growth rate exceeds the seventh preset threshold so that the computer crash risk of the system is automatically determined through relevant monitoring parameters of a load unit, and the processing efficiency when solving the computer crash problem is further improved.

The step of generating the computer crash prediction result for the first operating system through the first power information and/or the first traffic information includes:

determining a fourth traffic growth rate for the hard disk occupancy rate; and generating the computer crash prediction result for the first operating system when the fourth traffic growth rate exceeds an eighth preset threshold.

In practical application, since the power information and the traffic information may be used separately as the criteria for determining whether system computer crash occurs, or may be used together to determine whether system computer crash occurs, in practical application, parameters for determining whether system computer crash occurs may also be different for different hardware.

In practical application, the traffic growth rate may be a ratio of the data traffic increase in the present period to the traffic information average increase in the previous period, and the traffic growth rate may be an important indicator to determine the system computer crash.

Therefore, in some embodiments, the hard disk occupancy rate for the hard disk may be used as a reference indicator to determine whether system computer crash occurs to generate the computer crash prediction result for the first operating system.

In some embodiments, the state prediction unit may determine the fourth traffic growth rate for the hard disk occupancy rate, configure a corresponding eighth preset threshold for the fourth traffic growth rate, and generate the computer crash prediction result for the first operating system when the fourth traffic growth rate exceeds the eighth preset threshold.

In some embodiments, the fourth traffic growth rate for the hard disk occupancy rate is determined, and the computer crash prediction result for the first operating system is generated when the fourth traffic growth rate exceeds the eighth preset threshold so that the computer crash risk of the system is automatically determined through relevant monitoring parameters of a load unit, and the processing efficiency when solving the computer crash problem is further improved.

In some embodiments, the electronic device has a corresponding baseboard management controller (BMC) and a corresponding system monitoring unit, and the step of running the second operating system based on the computer crash prediction result, and switching to the second operating system to process the electronic data includes:

when the BMC receives the computer crash prediction result, controlling the BMC to send a monitoring instruction to the system monitoring unit, wherein the monitoring instruction is used for controlling the system monitoring unit to stop acquiring the first power information of the electronic device and to acquire a second traffic information of the electronic device; and when the second traffic information does not change within a preset time period, running the second operating system, and switching to the second operating system to process the electronic data.

In some embodiments, the electronic device of the present application that supports real-time exchange rates may have a corresponding BMC (fully referred to as baseboard management controller), which performs the functions of a server remote management controller. The BMC may perform some operations, such as firmware upgrading and machine device viewing, while the machine is not powered on.

In practical application, generating the computer crash prediction result is only a prediction behavior for determining the system computer crash. Therefore, in order to further verify whether system computer crash occurs, after predetermining a possible abnormal situation that may occur, the computer crash prediction result may be provided to the BMC unit. The BMC unit records the traffic information of the current load unit, starts to monitor the current data traffic situation in real time during the recording process, and finally determines whether system computer crash occurs.

In some embodiments, if the system computer crash occurs due to the abnormal power condition of the load unit, the data processing stagnation phenomenon will also eventually be shown in the traffic condition. The abnormal power information only has a certain probability of computer crash. Therefore, in some embodiments, the power information may only be used in a predetermination stage. That is, with regard to the determination of whether system computer crash occurs, the power information may only participate in the process of generating the computer crash prediction result, and the traffic information may be used as a final determination condition of whether system computer crash occurs.

In some embodiments, when the BMC receives the computer crash prediction result and completes the real-time recording of the state information, the BMC may be controlled to send a state monitoring instruction to the system monitoring unit to control the system monitoring unit to stop monitoring the power information of the load unit and to uniformly monitor the traffic information more accurately. After acquiring the second traffic information, the system monitoring unit sends the second traffic information to the BMC. The BMC determines that the second traffic information does not change within the preset time period, for example, the CPU multi-core processing rate, the input/output operations per second (IOPS) condition of the DDR and the hard disk at the current moment, and the occupation condition of hard disk resources do not change, representing that system computer crash may be automatically run through the BMC, and the second operating system is switched to to process the electronic data.

Input/output operations per second (IOPS) is a measurement method used for the performance test of computer storage devices (such as hard disk (HDD), solid state disk (SSD), or storage area network (SAN)) and may be considered as the number of read-write operations per second.

In some embodiments, when the BMC receives the computer crash prediction result, the BMC is controlled to send a monitoring instruction to the system monitoring unit. The monitoring instruction is used for controlling the system monitoring unit to stop acquiring the first power information of the electronic device and to acquire the second traffic information of the electronic device. When the second traffic information does not change within the preset time period, the second operating system is run, and the second operating system is switched to to process the electronic data, thereby that system computer crash occurs is accurately determined. In addition, the operating system is automatically switched through the BMC, thereby the processing efficiency when solving the computer crash problem is further improved.

In some embodiments, the step of running the second operating system, and switching to the second operating system to process the electronic data includes:

acquiring second power information of the electronic device; and when power parameters of the electronic device are determined to be stable through the first power information and the second power information, running the second operating system, and switching to the second operating system to process the electronic data.

In practical application, the power parameters of the load unit may include the working current parameter and the working voltage parameter of the load unit. If the power parameters are unstable, the system switching may fail. Whether the power parameters are stable determines, to a certain extent, whether the operating system may be switched smoothly.

In some embodiments, the second power information of the electronic device may be acquired. The second power information may be power information re-acquired after generating the computer crash prediction result, and the second power information may not participate in the stage of determining whether system computer crash occurs.

When the power parameters of the electronic device are determined to be stable through the first power information and the second power information, the second operating system may be run, and the second operating system is switched to to process the electronic data.

In some embodiments, the BMC sends an instruction to a power system monitoring unit in the system monitoring unit to perform secondary monitoring on the front power and the rear power, and sends a system switching instruction to the CPU when the front power and the rear power are monitored to be recovered to be stable.

In some embodiments, the second power information of the electronic device is acquired. When the power parameters of the electronic device are determined to be stable through the first power information and the second power information, the second operating system is run, and the second operating system is switched to to process the electronic data. Thus, the failure of the system switching due to voltage/current instability is avoided, the success rate in system switching is ensured, and the processing efficiency when solving the computer crash problem is further improved.

In some embodiments, when the power parameters of the electronic device are determined to be unstable within the preset time period through the first power information and the second power information, power supply abnormal information is generated, and the supply abnormal information is stored to the BMC.

In some embodiments, the BMC sends an instruction to the power system monitoring unit in the system monitoring unit to perform secondary monitoring on the front power and the rear power. If the front power and the rear power are not recovered after a certain period of time, the state switching process is exited, the power supply abnormal information is diagnosed, and an abnormal log is recorded in the BMC unit for a relevant technician to perform a debug query.

In some embodiments, when the power parameters of the electronic device are determined to be unstable within the preset time period through the first power information and the second power information, the power supply abnormal information is generated, and the power supply abnormal information is stored to the BMC so that the relevant technician may query the cause of the error, thereby the fault is eliminated and the processing efficiency when solving the computer crash problem is further improved.

In some embodiments, before the step of controlling the BMC to send a monitoring instruction to the system monitoring unit, the method further includes:

determining to-be-processed information for each load unit; and inputting the to-be-processed information into a flash memory unit of the BMC.

In practical application, in the related art, data loss may be caused when a device is restarted. In order to solve this technical problem, before controlling the BMC to send the monitoring instruction to the system monitoring unit, the to-be-processed information for each load unit may be determined, and the to-be-processed information is inputted into the flash memory unit of the BMC.

In some embodiments, when it is predicted in the prediction process that there is a risk of system computer crash in the next state, i.e., when the computer crash prediction result is generated, the first operating system may interact with the BMC to record the processing data condition of each load unit under the current system in the flash memory unit FLASH of the BMC.

For example, the state predetermination unit notifies the BMC unit of the computer crash prediction result after giving that there is an abnormal risk in the current state. At this moment, the BMC unit sends a state recording instruction to the system monitoring unit. Thus, on one hand, the system monitoring unit reads information transmitted by a front-end server to a back-end storage at this moment through the I/O card and on the other hand, the system monitoring unit reads information processed completely by the CPU in the current state. Meanwhile, the system monitoring unit compares the two pieces of information to obtain the to-be-processed information of the CPU. The to-be-processed information may also be collectively referred to as current state information, and the state information is summarized and recorded in real time in the FLASH of the BMC unit and updated in real time.

In some embodiments, the electronic device is loaded with a corresponding basic input/output system (BIOS), and the method further includes:

restarting the BIOS, controlling the flash memory unit to perform data interaction with a bootstrap program of the BIOS to control the bootstrap program to run the second operating system based on the to-be-processed information inputted into the flash memory unit, and switching to the second operating system to process the electronic data.

After the processing data condition of each load unit under the current system is recorded in the flash memory unit FLASH of the BMC, the BIOS may be restarted, the flash memory unit is controlled to perform data interaction with the bootstrap program of the BIOS to control the bootstrap program to run the second operating system based on the to-be-processed information inputted into the flash memory unit, and the second operating system is switched to to process the electronic data.

In some embodiments, when it is predicted in the prediction process that there is a risk of system computer crash in the next state, i.e., when the computer crash prediction result is generated, the first operating system may interact with the BMC to record the processing data condition of each load unit under the current system in the flash memory unit FLASH of the BMC. Once the system monitoring unit detects that the data processing task is suspended, the BIOS is restarted after it is confirmed that both the front power and the rear power of the system start up without error. After the BIOS is restarted, the system is automatically guided into the second operating system through the bootstrap program, and the second operating system immediately starts working. While the second operating system is entered, the BMC unit sends the recorded state-related information to the system, and the current second operating system quickly reads running state information before the computer crash to ensure returning to the state before the computer crash in the shortest time, data may not be lost, and data processing-related work is not affected.

In some embodiments, the to-be-processed information for each load unit is determined, and the to-be-processed information is inputted into the flash memory unit of the BMC. The BIOS is restarted, the flash memory unit is controlled to perform data interaction with the bootstrap program of the BIOS to control the bootstrap program to run the second operating system based on the to-be-processed information inputted into the flash memory unit, and the second operating system is switched to to process the electronic data, thereby returning to the state before the computer crash in the shortest time is ensured. In addition, data may not be lost, data processing-related work is not affected, and the processing efficiency when solving the computer crash problem is further improved.

In some embodiments, the method further includes:

when the second traffic information changes within the preset time period, generating a prediction error record using the BMC, and releasing the to-be-processed information.

In practical application, there may also be a situation where the computer crash prediction result is inaccurate. Therefore, in some embodiments, after generating the computer crash prediction result, if the system works normally after a period of time and there is no stagnation of the load unit traffic, this prediction is characterized to be a prediction error. In order to reduce the load pressure of the BMC and enable the relevant technician to better debug the state predetermination unit, the BMC may automatically release the recorded current state information in the FLASH after recording this abnormal situation, and automatically control the system monitoring unit to restart a new round of monitoring, thereby real-time monitoring of the electronic device is ensured.

In some embodiments, when the second traffic information changes within the preset time period, the prediction error record is generated using the BMC, and the to-be-processed information is released, thereby the load pressure of the BMC in the event of a false report is reduced and the processing efficiency when solving the computer crash problem is further improved.

In order to make a person skilled in the art better understand the embodiments of the present application, a complete example is described below.

In some embodiments, the electronic device may include a system monitoring unit, a state predetermination unit, a system state recording unit and a system switching execution unit.

Referring to FIG. 2, it is a flowchart of steps of another method for processing data of an electronic device according to some embodiments of the present application. When the system is working normally, the system monitoring unit monitors power information and traffic information of a load unit in the system, reports the process in real time, and reports monitored real-time data to a state prediction unit. The prediction unit sequentially analyzes and quantifies the monitored parameter values according to historical data, until it is determined that one or both of the monitored power/traffic information of the system may have an abnormality. After predetermining a possible abnormal situation, the prediction situation is provided to the BMC unit. The BMC unit records state information of the current system processing data traffic, and starts to monitor the current data traffic situation in real time during the recording process. When it is monitored that the traffic information of each current load unit and processor unit has a stagnation phenomenon, it is diagnosed that the system is in a computer crash state. After confirming that the front power and the rear power are correct, the BMC unit restarts the BIOS and automatically guides data into an operating system in system disk two, and provides the state information to the current operating system at the same time. When the occurrence of an abnormal situation is predicted, but the system continues to operate normally for a period of time without any signs of traffic stagnation, it indicates a prediction error. The BMC automatically releases the recorded current state information in the FLASH after recording this abnormal situation and restarts a new round of monitoring.

Referring to FIG. 3, it is a schematic diagram of data interaction for a system monitoring unit according to some embodiments of the present application. The system monitoring unit is divided into two parts, i.e., power monitoring and traffic monitoring, so as to timely find two influencing factors of system computer crash, i.e., system computer crash caused by an unstable load power supply state and system computer crash caused by excessive consumption of system resources during operation.

The design of the system monitoring unit may be based on a single chip microcomputer system, and the power information at that time may be acquired by monitoring a power supply chip IMON pin. The acquired power information mainly includes a CPU unit, a DDR SDRAM unit, a high-speed serial computer expansion bus standard switching device PCIE SWITCH unit, a peripheral IO card unit (hereinafter referred to for short as a peripheral IO card), and a corresponding storage medium unit. The power information of the peripheral IO card and the storage medium is sampled by a current measurement chip and then summarized in the single chip microcomputer. Because of the relatively low power and large number of IO cards and storage media, it is not convenient to review the power supply chip pin information. Therefore, the sampling resistors are placed in the circuits, and after the sampling information is summarized in the current metering chip, the summarized sampling information is uniformly provided to the single chip microcomputer unit. Traffic monitoring is the monitoring and summarization of the current data transmission situations. The data processing situation of a storage server mainly includes the data read from the IO card, the analysis and processing of the read data in the CPU, the caching of the data in the DDR, and the final storage of the data resources in the hard disk. Therefore, the main monitoring items include the CPU multi-core processing rate at this moment, the IOPS condition of the DDR and the hard disk at the current moment and the occupancy rate of the hard disk resources, which may be uniformly summarized into the single chip microcomputer unit after the monitoring is completed. In addition, the traffic system monitoring unit may also perform data read-write monitoring, i.e., monitoring the content of the data processed by the CPU in the current state, and this monitoring mode is started after the prediction unit predetermines an abnormality in the next step.

Referring to FIG. 4, it is a schematic diagram of a data processing flow for a state predetermination unit according to some embodiments of the present application. During the state predetermination process, input parameters required by the state predetermination unit may be three traffic parameters of the CPU multi-core processing rate, the IOPS condition of the DDR and the hard disk at the current moment and the occupancy rate of the hard disk resources, as well as power information of relevant units such as the CPU unit, the DDR unit, the PCIE SWITCH unit, and the peripheral IO card unit. An output parameter is a predicted abnormal risk value. When the risk value is higher than a preset risk threshold, the state predetermination is that there is a computer crash risk, and an abnormal preparation signal may be sent to the subsequent system state recording unit and system switching execution unit. When the risk value is lower than the risk threshold, the state predetermination unit may return to the initial state and continue monitoring. An initial risk value may be counted as 0, and two parameters of the traffic growth rate and the power fluctuation rate of each load unit may be calculated according to the input parameters. The traffic growth rate is equal to a ratio of the data traffic increase in the present period to the traffic information average increase in the previous period, and the power fluctuation rate is equal to a ratio of the unit current increase value in the current period to the unit current increase value in the previous period. After the parameter calculation is completed, a unit where the fluctuations of the power information and the traffic information have a positive growth at the same time, or a load unit where the variation amplitude of any one of the power fluctuation rate and the traffic growth rate is higher than the preset threshold is selected. For the above-mentioned two cases, an increase value of the risk value is an average value of the power fluctuation rate and the traffic growth rate parameters at that moment.

Referring to FIG. 5, it is a schematic diagram of a data processing flow for a system state recording unit and a system switching execution unit according to some embodiments of the present application. The system switching execution unit may include a BMC unit. The state predetermination unit notifies the BMC unit of the abnormal risk situation after giving that there is an abnormal risk in the current state. At this moment, the BMC unit may send a state recording instruction to the system monitoring unit. On one hand, the system monitoring unit reads information transmitted by a front-end server to a back-end storage at this moment through the I/O card, and on the other hand, the system monitoring unit reads information processed completely by the CPU in the current state. Meanwhile, the system monitoring unit compares the two pieces of information to obtain the to-be-processed information of the CPU. The to-be-processed information obtained by comparing the read information may also be collectively referred to as current state information, and the state information is summarized and recorded in real time in the FLASH of the BMC unit and updated in real time. After the real-time recording of the state information is completed, the BMC sends a secondary state monitoring instruction to the system monitoring unit. At this moment, the power state monitoring is closed, and the traffic information is uniformly monitored more accurately. This is because if the abnormal power condition at this moment causes system computer crash, the data processing stagnation phenomenon will eventually be shown in the traffic condition. The abnormal power condition only has a certain probability of computer crash. Therefore, the power condition may only be used in a predetermination stage, and finally whether the computer crash occurs may be determined according to the traffic information. When the traffic information stagnates during a period of time, i.e., the CPU multi-core processing rate, the IOPS condition of the DDR and the hard disk at the current moment, and the occupation condition of hard disk resources do not change, it may be determined that system computer crash occurs. After the computer crash occurs, the BMC sends an instruction to the power monitoring unit in the system monitoring unit to perform secondary monitoring on the front power and the rear power. When it is monitored that the front power and the rear power are recovered to be stable, the BMC sends a system switching instruction to the CPU. If the front power and the rear power are not recovered after a certain period of time, the state switching process is exited, the power supply abnormal information is diagnosed, and an abnormal log is recorded in the BMC unit for a developer to perform a debug query. After receiving the system switching instruction of the BMC unit, the CPU immediately restarts the BIOS. In the process of restarting, self-checking may be first performed on hardware of each load unit, and after completing the self-checking, a command interaction between the BIOS and the BMC is performed. The implementation of the command interaction between underlying software is the core for the system to complete the switching and avoid the influence caused by the computer crash. The hardware object of the interaction process is the FLASH chip of the BMC and the read-only memory (ROM) chip stored in the system bootstrap program and IO program in the BIOS. The BMC temporarily modifies the bootstrap program to guide it into the operating system of a standby system disk. This modification process may be one-time erasable, i.e., not guiding into this standby operating system again when restarting the system. After completing the modification of the bootstrap program, the BMC modifies and adds the IO port program in the BIOS, changes the initial configuration of the IO port in the original start-up process to the current state information previously recorded in the FLASH unit of the BMC, informs a transmission unit of the running state before the system computer crash through the modified state information, and informs the CPU unit of the operation to be done after switching the standby system. After completing the interaction between the underlying software, a system switching operation is performed, the system is guided into a standby system disk through a modified bootstrap program, and the operating system is updated to the running state before the computer crash through a modified IO port program. One system self-recovery operation is completed.

When the occurrence of an abnormal situation is predicted, but the system continues to operate normally for a period of time without any signs of traffic stagnation, it indicates that this prediction is a prediction error. The BMC automatically releases the recorded current state information in the FLASH after recording this abnormal situation and restarts a new round of monitoring.

In some embodiments of the present application, storage system computer crash self-recovery logic and relevant circuit units are designed in the unified storage array, including a system monitoring unit, a state predetermination unit, a system state recording unit and a system switching execution unit. The data preparation of the self-recovery function before system computer crash occurs is realized through bidirectional monitoring of power and traffic and state prediction algorithm, and the system switching and running state tracking after the system computer crash are successfully realized through the cooperation of a dual-system and the BMC unit. The self-recovery after the system computer crash may be successfully realized through the above-mentioned operations without restarting.

Further, in some embodiments of the present application, a power-traffic bidirectional monitoring unit is configured for the electronic device, which may not only monitor a current change situation of a main power load in a system, but also monitor current data traffic information of a data transmission relevant unit and quantitatively reflect a monitoring result to a state predetermination unit. The state predetermination unit refers to historical data and combines the current data traffic condition, quantizes the current state in a hierarchical form, and performs a simple next-state prediction. When it is predicted in the prediction process that there is a risk of system computer crash in the next state, the current system interacts with the BMC to record the processing data condition of each load unit under the current system in the FLASH of the BMC. Once the system monitoring unit detects that the data processing task is suspended, the BIOS is restarted after it is confirmed that both the front power and the rear power of the system start up without error. After the BIOS is restarted, the system is automatically guided into the standby system disk through the bootstrap program, and the standby system disk immediately starts working. While another system is entered, the BMC unit sends the recorded state-related information to the standby system, and the standby system quickly reads running state information before the computer crash to ensure returning to the state before the computer crash in the shortest time and not affecting data processing-related work. Therefore, the perfect switching between two systems is ensured to avoid the influence of system computer crash, and the data backup processing reliability of the storage device is improved.

It should be noted that for simplicity of explanation, method embodiments are presented as a series of combinations of actions, but a person skilled in the art should appreciate that some embodiments of the present application are not limited by the order of actions described, as some steps may be performed in other orders or simultaneously according to some embodiments of the present application. In addition, a person skilled in the art should also appreciate that the actions involved are not necessarily necessary for some embodiments of the present application.

Figure 6:
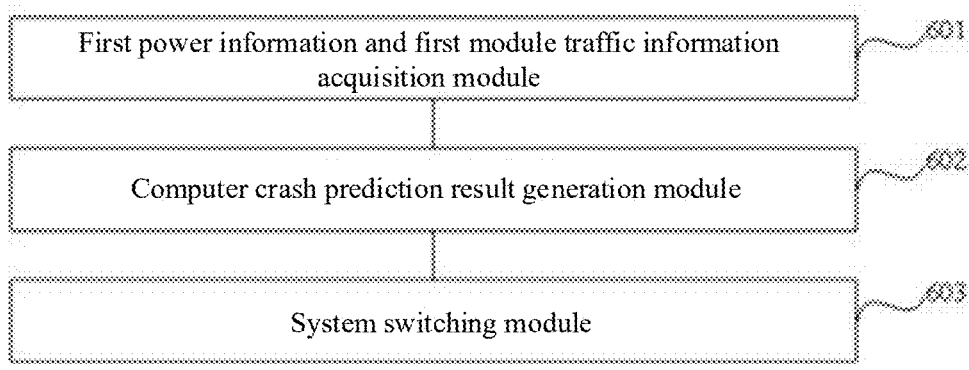
FIG. 6 is a block diagram of a structure of an apparatus for processing data of an electronic device according to some embodiments of the present application.

Referring to FIG. 6, a block diagram of a structure of an apparatus for processing data of an electronic device according to some embodiments of the present application is shown. The apparatus may include the following modules:

a first power information and first module traffic information acquisition module 601 configured to acquire first power information of the electronic device and acquire first traffic information of the electronic device when the electronic device runs the first operating system;

a computer crash prediction result generation module 602 configured to generate a computer crash prediction result for the first operating system through the first power information and/or the first traffic information; and a system switching module 603 configured to run the second operating system based on the computer crash prediction result, and switch to the second operating system to process electronic data.

In some embodiments, the electronic device includes a CPU, and the first power information and first module traffic information acquisition module may also be configured to acquire central processing unit power information of the CPU.

In some embodiments, the electronic device includes a memory unit, and the first power information and first module traffic information acquisition module may also be configured to acquire memory unit power information of the memory unit.

In some embodiments, the electronic device includes a high-speed serial computer expansion bus standard conversion unit, and the first power information and first module traffic information acquisition module may also be configured to acquire conversion unit power information of the high-speed serial computer expansion bus standard conversion unit.

In some embodiments, the electronic device includes an input/output peripheral device unit and a storage medium unit, and the first power information and first module traffic information acquisition module may also be configured to acquire peripheral device and storage medium power information of the input/output peripheral device unit and the storage medium unit.

In some embodiments, the input/output peripheral device unit and the storage medium unit each have a corresponding electrical transmission route, and the electrical transmission routes are configured with sampling resistors for the input/output peripheral device unit and the storage medium unit; the electronic device is configured with a current measurement chip; the first power information and first module traffic information acquisition module may also be configured to acquire the peripheral device and storage medium power information of the input/output peripheral device unit and the storage medium unit through the current measurement chip and the sampling resistors.

In some embodiments, the first power information and first module traffic information acquisition module may also be configured to acquire central processing unit read-write rate information of the CPU.

In some embodiments, the electronic device includes a hard disk, and the first power information and first module traffic information acquisition module may also be configured to acquire memory unit read-write rate information of the memory unit and hard disk read-write rate information of the hard disk.

In some embodiments, the first power information and first module traffic information acquisition module may also be configured to acquire a hard disk occupancy rate of the hard disk.

In some embodiments, the computer crash prediction result generation module may also be configured to generate the computer crash prediction result for the first operating system when the power consumption and the data processing amount of the CPU are determined to have a positive growth through the central processing unit power information and the central processing unit read-write rate information.

In some embodiments, the computer crash prediction result generation module may also be configured to determine a first power fluctuation rate for the central processing unit power information; and
    generate the computer crash prediction result for the first operating system when the first power fluctuation rate exceeds a first preset threshold.

In some embodiments, the computer crash prediction result generation module may also be configured to determine a first traffic growth rate for the central processing unit read-write rate information; and
    generate the computer crash prediction result for the first operating system when the first traffic growth rate exceeds a second preset threshold.

In some embodiments, the computer crash prediction result generation module may also be configured to generate the computer crash prediction result for the first operating system when the power consumption and the data processing amount of the memory unit are determined to have a positive growth through the memory unit power information and the memory unit read-write rate information.

In some embodiments, the computer crash prediction result generation module may also be configured to determine a second power fluctuation rate for the memory unit power information; and
    generate the computer crash prediction result for the first operating system when the second power fluctuation rate exceeds a third preset threshold.

In some embodiments, the computer crash prediction result generation module may also be configured to determine a second traffic growth rate for the memory unit read-write rate information; and
    generate the computer crash prediction result for the first operating system when the second traffic growth rate exceeds a fourth preset threshold.

In some embodiments, the computer crash prediction result generation module may also be configured to determine a third power fluctuation rate for the conversion unit power information; and
    generate the computer crash prediction result for the first operating system when the third power fluctuation rate exceeds a fifth preset threshold.

In some embodiments, the computer crash prediction result generation module may also be configured to determine a fourth power fluctuation rate for the peripheral device and storage medium power information; and
    generate the computer crash prediction result for the first operating system when the fourth power fluctuation rate exceeds a sixth preset threshold.

In some embodiments, the computer crash prediction result generation module may also be configured to determine a third traffic growth rate for the hard disk read-write rate information; and
    generate the computer crash prediction result for the first operating system when the third traffic growth rate exceeds a seventh preset threshold.

In some embodiments, the computer crash prediction result generation module may also be configured to determine a fourth traffic growth rate for the hard disk occupancy rate; and
    generate the computer crash prediction result for the first operating system when the fourth traffic growth rate exceeds an eighth preset threshold.

In some embodiments, the electronic device has a corresponding BMC and a corresponding system monitoring unit; the second operating system is run based on the computer crash prediction result, and the system switching module may also be configured to, when the BMC receives the computer crash prediction result, control the BMC to send a monitoring instruction to the system monitoring unit, wherein the monitoring instruction is used for controlling the system monitoring unit to stop acquiring the first power information of the electronic device and to acquire a second traffic information of the electronic device; and
    when the second traffic information does not change within a preset time period, run the second operating system, and switch to the second operating system to process the electronic data.

In some embodiments, the system switching module may also be configured to acquire second power information of the electronic device; and when power parameters of the electronic device are determined to be stable through the first power information and the second power information, run the second operating system, and switch to the second operating system to process the electronic data.

In some embodiments, the system switching module may also be configured to, when the power parameters of the electronic device are determined to be unstable within the preset time period through the first power information and the second power information, generate power supply abnormal information, and store the power supply abnormal information to the BMC.

In some embodiments, the system switching module may also be configured to determine to-be-processed information for each load unit; and input the to-be-processed information into a flash memory unit of the BMC.

In some embodiments, the electronic device is loaded with a corresponding BIOS, and the system switching module may also be configured to restart the BIOS, control the flash memory unit to perform data interaction with a bootstrap program of the BIOS to control the bootstrap program to run the second operating system based on the to-be-processed information inputted into the flash memory unit, and switch to the second operating system to process the electronic data.

In some embodiments, the system switching module may also be configured to, when the second traffic information changes within the preset time period, generate a prediction error record using the BMC, and release the to-be-processed information.

With respect to the apparatus embodiment, which is substantially similar to the method embodiment, the description is relatively simple with reference to the description of the method embodiment.

Additionally, an electronic device is further provided in some embodiments of the present application, including: a processor, a memory, and a computer program stored in the memory and executable on the processor. The computer program, when executed by the processor, implements various processes of the above-mentioned embodiments of the method for processing the data of the electronic device and may achieve the same technical effect. In order to avoid repetition, the description thereof will not be repeated.

A non-transitory computer-readable storage medium is further provided in some embodiments of the present application, the non-transitory computer-readable storage medium stores a computer program which, when executed by a processor, implements various processes of the above-mentioned embodiments of method for processing the data of the electronic device and may achieve the same technical effect. In order to avoid repetition, the description thereof will not be repeated. The computer-readable storage medium may be a ROM, a random access memory (RAM), a magnetic disk, or an optical disk.

Figure 7:
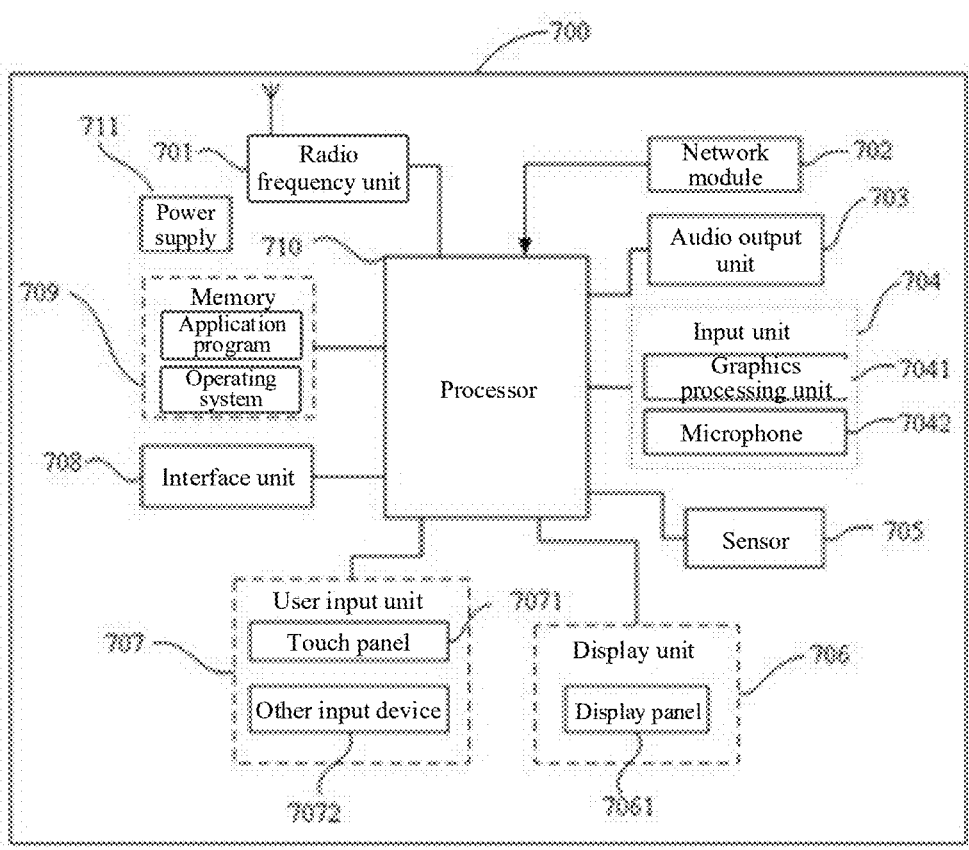
FIG. 7 is a block diagram of a structure of hardware of an electronic device according to some embodiments of the present application.

FIG. 7 is a schematic diagram of a structure of hardware of an electronic device implementing various embodiments of the present application.

The electronic device 700 includes, but is not limited to: a radio frequency unit 701, a network module 702, an audio output unit 703, an input unit 704, a sensor 705, a display unit 706, a user input unit 707, an interface unit 708, a memory 709, a processor 710, and a power supply 711. It will be appreciated by a person skilled in the art that the structure of the electronic device shown in FIG. 7 does not constitute a limitation on the electronic device. The electronic device may include more or fewer components than those illustrated, or a combination of some components, or have a different arrangement of components. In some embodiments of the present application, electronic devices include, but are not limited to, mobile phones, tablet computers, notebook computers, palmtops, vehicle terminals, wearable devices and pedometers.

It should be understood that in some embodiments of the present application, the radio frequency unit 701 may be configured to receive and send signals during information receiving and sending or calling. In some embodiments, the radio frequency unit 701 may also be configured to after receiving downlink data from a base station, send the downlink data to the processor 710 for processing, and transmit uplink data to the base station. Generally, the radio frequency unit 701 includes, but is not limited to, an antenna, at least one amplifier, a transceiver, a coupler, a low-noise amplifier and a duplexer. In addition, the radio frequency unit 701 may also be communicated with networks and other devices through a wireless communication system.

The electronic device provides the user with wireless broadband Internet access through the network module 702, such as assisting the user in receiving and sending e-mail, browsing web pages, and accessing streaming media.

The audio output unit 703 may convert audio data received by the radio frequency unit 701 or the network module 702 or stored in the memory 709 into an audio signal and output as sound. Moreover, the audio output unit 703 may also provide audio output (such as call signal reception sound and message reception sound) related to a particular function executed by the electronic device 700. The audio output unit 703 includes a speaker, a buzzer, a receiver, etc.

The input unit 704 is configured to receive an audio or video signal. The input unit 704 may include a graphics processing unit (GPU) 7041 and a microphone 7042. The GPU 7041 processes image data of a static picture or video obtained by an image capturing apparatus (such as a camera) in a video capturing mode or an image capturing mode. A processed image frame may be displayed on the display unit 706. The image frame processed by GPU 7041 may be stored in memory 709 (or other storage medium) or sent via the radio frequency unit 701 or the network module 702. The microphone 7042 may receive sound and process such sound into audio data. The processed audio data may be converted into a format that may be sent to a mobile communication base station via the radio frequency unit 701 in a telephone call mode for outputting.

The electronic device 700 also includes at least one sensor 705, such as a light sensor, a motion sensor, and other sensors. In some embodiments, the light sensor includes an ambient light sensor and a proximity sensor. The ambient light sensor may adjust the brightness of a display panel 7061 according to the brightness of ambient light, and the proximity sensor may turn off the display panel 7061 and/or backlight when the electronic device 700 moves to the ear. As a kind of motion sensor, an accelerometer sensor may detect the size of acceleration in various directions (generally three axes), may detect the size and direction of gravity at rest, and may be configured to identify postures of an electronic device (such as horizontal and vertical screen switching, relevant games and magnetometer posture calibration), vibration recognition related functions (such as pedometer and knocking), etc. The sensor 705 may also include a fingerprint sensor, a pressure sensor, an iris sensor, a molecular sensor, a gyroscope, a barometer, a hygrometer, a thermometer, an infrared sensor, etc., which will not be described in detail herein.

The display unit 706 is configured to display information inputted by the user or information provided to the user. The display unit 706 may include the display panel 7061, which may be configured in the form of a liquid crystal display (LCD), an organic light-emitting diode (OLED), etc.

The user input unit 707 may be configured to receive inputted number or character information and generate key signal input related to user settings and function control of the electronic device. In some embodiments, the user input unit 707 includes a touch panel 7071 and other input devices 7072. The touch panel 7071, also referred to as a touch screen, may collect user touch operations on or near the touch screen (such as user operations on or near the touch panel 7071 using any suitable object or accessory, such as a finger, and a stylus). The touch panel 7071 may include two parts, i.e., a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a touch point coordinate, sends the touch point coordinate to the processor 710, and receives and executes a command sent by the processor 710. In addition, the touch panel 7071 may be implemented using various types such as resistive, capacitive, infrared, and surface acoustic waves. In addition to the touch panel 7071, the user input unit 707 may also include other input devices 7072. In some embodiments, other input devices 7072 may include, but are not limited to, a physical keyboard, a function key (such as a volume control key and a switch key), a trackball, a mouse, a joystick, etc., which will not be described in detail herein.

Further, the touch panel 7071 may be covered on the display panel 7061. When the touch panel 7071 detects a touch operation on or near the touch panel 7071, the touch operation is transmitted to the processor 710 to determine the type of the touch event. Then, the processor 710 provides a corresponding visual output on the display panel 7061 according to the type of the touch event. Although in FIG. 7, the touch panel 7071 and the display panel 7061 are used as two separate components to realize the input and output functions of the electronic device, in some embodiments, the touch panel 7071 and the display panel 7061 may be integrated to realize the input and output functions of the electronic device, which is not limited herein.

The interface unit 708 is an interface wherein an external apparatus is connected to the electronic device 700. For example, the external apparatus may include a wired or wireless headset port, an external power supply (or battery charger) port, a wired or wireless data port, a memory card port, a port configured to connect to an apparatus having an identification module, an audio I/O port, a video I/O port, an earphone port, etc. The interface unit 708 may be configured to receive input (such as data information and power) from the external apparatus and transmit the received input to one or more elements within the electronic device 700 or may be configured to transmit data between the electronic device 700 and the external apparatus.

The memory 709 may be configured to store software programs and various data. The memory 709 may mainly include a program storage area and a data storage area. The program storage area may store an operating system, an application program required by at least one function (such as a sound playing function and an image playing function), etc. The data storage area may store data (such as audio data and a phone book) created according to the use of the mobile phone, etc. In addition, the memory 709 may include a high-speed RAM and a non-transitory memory, such as at least one magnetic disk storage device, a flash memory device, or other volatile solid-state storage devices.

The processor 710 is a control center of the electronic device, connects various parts of the entire electronic device using various interfaces and lines, and performs various functions and process data of the electronic device by running or executing software programs and/or modules stored in the memory 709 and invoking data stored in the memory 709, thus the electronic device is monitored as a whole. The processor 710 may include one or more processing units. In some embodiments, the processor 710 may integrate an application processor and a modem processor. The application processor mainly handles operating systems, user interfaces, application programs, etc., and the modem processor mainly handles wireless communications. It will be appreciated that the above-mentioned modem processor may not be integrated into the processor 710.

The electronic device 700 may also include a power supply 711 (such as a battery) to power the various components. In some embodiments, the power supply 711 may be logically connected to the processor 710 through a power supply management system so that functions such as managing charging, discharging, and managing power consumption are realized through the power supply management system.

In addition, the electronic device 700 includes some functional modules, which are not shown and will not be described in detail herein.

It should be noted that, as used herein, the terms "include", "contain", or any other variation thereof are intended to cover a non-exclusive inclusion so that a process, method, article, or apparatus that includes a list of elements does not include only those elements but may include other elements not expressly listed or inherent to such process, method, article, or apparatus. An element limited by the phrase "include a . . . " does not, without more constraints, preclude the existence of additional identical elements in the process, method, article, or apparatus that includes the element.

Through the description of the above implementations, it will be clear to a person skilled in the art that the method of the above-mentioned embodiments may be implemented by software and a necessary general hardware platform, and of course by hardware. Based on such an understanding, the technical solution of the present application essentially or in part contributing to the related art may be embodied in the form of a software product. A computer software product is stored in a storage medium (such as the ROM/RAM, magnetic disk, and optical disk) including several instructions for causing a terminal (which may be a mobile phone, a computer, a server, an air conditioner, or a network device, etc.) to perform the method according to various embodiments of the present application.

Figure 8:
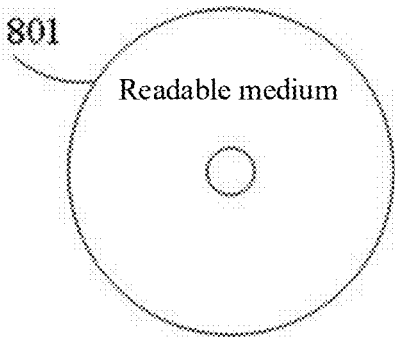
FIG. 8 is a schematic diagram of a non-transitory computer-readable medium according to some embodiments of the present application.

As shown in FIG. 8, a non-transitory computer-readable storage medium 801 storing instructions is further provided in some embodiments of the present application, the instructions, when run on a computer, cause the computer to perform the method for processing the data of the electronic device in the above-mentioned embodiments.

The embodiments of the present application are described above with reference to the drawings, but the present application is not limited to the above-mentioned implementations. The above-mentioned implementations are merely illustrative and not restrictive. A person skilled in the art, inspired by the present application and without departing from the purpose of the present application and the scope of the claims, may also make many forms, all of which fall within the scope of the present application.

A person skilled in the art may recognize that the units and algorithmic steps of the examples described in some embodiments of the present application may be implemented in electronic hardware or in a combination of computer software and electronic hardware. Whether these functions are implemented in hardware or software depends on the application and design constraints of the technical solutions. A person skilled in the art may use different methods to achieve the described function for each particular application, but this implementation shall not be considered outside the scope of the present application.

It will be clear to a person skilled in the art that, for convenience and brevity of description, the working processes of the systems, apparatuses, and units described above may be described with reference to corresponding processes in the foregoing method embodiments and will not be described in detail herein.

In the embodiments provided by the present application, it should be understood that the disclosed apparatus and method may be implemented in other ways. For example, the apparatus embodiments described above are merely illustrative. For example, the partitioning of units is merely a logical function partitioning, and actual implementations may have additional partitioning, such as a plurality of units or assemblies may be combined or integrated into another system, or some features may be omitted or not performed. In addition, the couplings, direct couplings, or communication connections shown or discussed with respect to each other may be indirect couplings or communication connections through some interfaces, apparatuses, or units, and may be electrical, mechanical, or otherwise.

The units illustrated as separate components may or may not be physically separated, and the components shown as units may or may not be physical units, i.e., may be located in one place, or may also be distributed over a plurality of network units. Some or all of the units may be selected to achieve the object of the solutions of the embodiments according to actual needs.

In addition, the functional units in various embodiments of the present application may be integrated in one processing unit, or each unit may physically exist separately, or two or more units may be integrated in one single unit.

Functions, if implemented in software functional units and sold or used as stand-alone products, may be stored in a computer-readable storage medium. Based on such an understanding, the technical solution of the present application essentially in part contributing to the related art, may be embodied in the form of a software product. The computer software product is stored in a storage medium including several instructions for causing a computer device (which may be a personal computer, a server, or a network device, etc.) to perform all or part of the steps of the method according to various embodiments of the present application. The foregoing storage medium includes: a USB flash drive, a mobile hard disk, a ROM, a RAM, a magnetic disk, an optical disk, and various media that may store a program code.

The above are only implementations of the present application, and the scope of the present application is not limited thereto. Any changes and substitutions which may be readily thought of by a person skilled in the art within the technical scope disclosed in the present application fall within the scope of the present application. Therefore, the scope of the present application should be based on the scope limited by the claims.

The invention claimed is:

1. A method for processing data of an electronic device, wherein the electronic device is loaded with a first operating system and a second operating system, and the method comprises:

acquiring first power information of the electronic device and acquiring first traffic information of the electronic device in response to the electronic device running the first operating system;

generating a computer crash prediction result for the first operating system through the first power information and/or the first traffic information; and running the second operating system based on the computer crash prediction result, and switching to the second operating system to process electronic data;

wherein the electronic device has a corresponding baseboard management controller and a corresponding system monitoring unit, and the step of running the second operating system based on the computer crash prediction result, and switching to the second operating system to process the electronic data comprises:

in response to the baseboard management controller receiving the computer crash prediction result, controlling the baseboard management controller to send a monitoring instruction to the system monitoring unit, wherein the monitoring instruction is used for controlling the system monitoring unit to stop acquiring the first power information of the electronic device and to acquire a second traffic information of the electronic device; and in response to the second traffic information not changing within a preset time period, running the second operating system, and switching to the second operating system to process the electronic data.

2. The method according to claim 1, wherein the electronic device comprises a central processing unit, and the step of acquiring the first power information of the electronic device comprises:

acquiring central processing unit power information of the central processing unit.

3. The method according to claim 2, wherein the electronic device comprises a memory unit, and the method further comprises:

acquiring memory unit power information of the memory unit.

4. The method according to claim 3, wherein the electronic device comprises a high-speed serial computer expansion bus standard conversion unit, and the method further comprises:

acquiring conversion unit power information of the high-speed serial computer expansion bus standard conversion unit.

5. The method according to claim 4, wherein the electronic device comprises an input/output peripheral device unit and a storage medium unit, and the method further comprises:

acquiring peripheral device and storage medium power information of the input/output peripheral device unit and the storage medium unit.

6. The method according to claim 5, wherein the input/output peripheral device unit and the storage medium unit each have a corresponding electrical transmission route, and the electrical transmission routes are configured with sampling resistors for the input/output peripheral device unit and the storage medium unit; the electronic device is configured with a current measurement chip; the step of acquiring the peripheral device and storage medium power information of the input/output peripheral device unit and the storage medium unit comprises:

acquiring the peripheral device and storage medium power information of the input/output peripheral device unit and the storage medium unit through the current measurement chip and the sampling resistors.

7. The method according to claim 6, wherein the step of acquiring the first traffic information of the electronic device comprises:

acquiring central processing unit read-write rate information of the central processing unit.

8. The method according to claim 7, wherein the electronic device comprises a hard disk, and the method further comprises:

acquiring memory unit read-write rate information of the memory unit and hard disk read-write rate information of the hard disk.

9. The method according to claim 8, further comprising:
acquiring a hard disk occupancy rate of the hard disk.

10. The method according to claim 7, wherein the step of generating the computer crash prediction result for the first operating system through the first power information and/or the first traffic information comprises:

generating the computer crash prediction result for the first operating system in response to power consumption and data processing amount of the central processing unit being determined to have a positive growth through the central processing unit power information and the central processing unit read-write rate information.

11. The method according to claim 10, further comprising:

determining a first power fluctuation rate for the central processing unit power information; and generating the computer crash prediction result for the first operating system in response to the first power fluctuation rate exceeding a first preset threshold.

12. The method according to claim 11, further comprising:

determining a first traffic growth rate for the central processing unit read-write rate information; and generating the computer crash prediction result for the first operating system in response to the first traffic growth rate exceeding a second preset threshold.

13. The method according to claim 1, wherein the step of running the second operating system, and switching to the second operating system to process the electronic data comprises:

acquiring second power information of the electronic device; and in response to power parameters of the electronic device being determined to be stable through the first power information and the second power information, running the second operating system, and switching to the second operating system to process the electronic data.

14. The method according to claim 13, further comprising:

in response to the power parameters of the electronic device being determined to be unstable within the preset time period through the first power information and the second power information, generating power supply abnormal information and storing the power supply abnormal information to the baseboard management controller.

15. The method according to claim 13, wherein before the step of controlling the baseboard management controller to send the monitoring instruction to the system monitoring unit, the method further comprises:

determining to-be-processed information for each load unit; and inputting the to-be-processed information into a flash memory unit of the baseboard management controller.

16. The method according to claim 15, wherein the electronic device is loaded with a corresponding basic input/output system, and the method further comprises:

restarting the basic input/output system and controlling the flash memory unit to perform data interaction with a bootstrap program of the basic input/output system to control the bootstrap program to run the second operating system based on the to-be-processed information inputted into the flash memory unit, and switching to the second operating system to process the electronic data.

17. The method according to claim 15, further comprising:

in response to the second traffic information changing within the preset time period, generating a prediction error record using the baseboard management controller, and releasing the to-be-processed information.

18. An electronic device, comprising a processor, a communication interface, a memory and a communication bus, wherein the processor, the communication interface and the memory are communicated with each other through the communication bus;

the memory is configured to store a computer program; and the processor is configured to, in response to executing the program stored on the memory, implement the method according to claim 1.

19. A non-transitory computer-readable storage medium storing instructions which, in response to being executed by one or more processors, cause the one or more processors to perform the method according to claim 1.

* * * * *